US012264811B1

(12) United States Patent
Liu

(10) Patent No.: US 12,264,811 B1
(45) Date of Patent: Apr. 1, 2025

(54) RECHARGEABLE WALL LAMP

(71) Applicant: Haiyang Liu, Binzhou (CN)

(72) Inventor: Haiyang Liu, Binzhou (CN)

( * ) Notice: Subject to any disclaimer, the term of this patent is extended or adjusted under 35 U.S.C. 154(b) by 0 days.

(21) Appl. No.: 18/967,131

(22) Filed: Dec. 3, 2024

(30) Foreign Application Priority Data

Nov. 13, 2024 (CN) ......................... 202422764869.5

(51) Int. Cl.

| | |
|---|---|
| ***F21V 21/02*** | (2006.01) |
| ***F21S 8/00*** | (2006.01) |
| ***F21S 9/02*** | (2006.01) |
| ***F21V 21/096*** | (2006.01) |
| ***F21V 23/00*** | (2015.01) |
| ***F21V 23/04*** | (2006.01) |
| ***F21V 23/06*** | (2006.01) |

(52) U.S. Cl.

CPC .............. *F21V 23/06* (2013.01); *F21S 8/033* (2013.01); *F21S 9/02* (2013.01); *F21V 21/02* (2013.01); *F21V 21/096* (2013.01); *F21V 23/006* (2013.01); *F21V 23/04* (2013.01); *F21V 23/0485* (2013.01)

(58) Field of Classification Search

CPC ...... F21V 21/096; F21V 21/02; F21V 23/006; F21S 8/033; F21S 9/02

See application file for complete search history.

(56) References Cited

U.S. PATENT DOCUMENTS

| | | | | |
|---|---|---|---|---|
| 8,333,491 B1 * | 12/2012 | Chou | ...................... | F21S 9/024 362/183 |
| 9,068,707 B1 * | 6/2015 | Boxler | ...................... | F21S 8/00 |
| 12,188,633 B1 * | 1/2025 | Guan | ...................... | F21V 19/02 |
| 2005/0168977 A1 * | 8/2005 | Murphy | .................. | F21S 8/033 362/191 |
| 2016/0305637 A1 * | 10/2016 | Brunelli | .................. | F21V 21/30 |
| 2018/0031191 A1 * | 2/2018 | Xiang | ..................... | F21V 15/01 |

* cited by examiner

*Primary Examiner* — William N Harris

(74) *Attorney, Agent, or Firm* — Birchwood IP

(57) ABSTRACT

A rechargeable wall lamp is provided, which includes a front shell, a rear cover, a rechargeable battery, a carrier plate, a light emitting component, and a circuit board; an interior of the front shell includes an accommodation space, a front side of the front shell is provided with a translucent recess, a bottom of the translucent recess is hollowed out to communicate with the accommodation space, the rear cover is fixed to a rear side of the front shell to cover the accommodation space; the carrier plate is fixed to the front shell and located in a bottom hollow area of the translucent recess. The light emitting component is provided on one side of the carrier plate facing a notch of the translucent recess. The rechargeable battery and the circuit board are provided in the accommodation space. The rechargeable battery is connected to the circuit board.

10 Claims, 12 Drawing Sheets

100

100

RECHARGEABLE WALL LAMP

CROSS-REFERENCE TO RELATED APPLICATIONS

This application claims priority to Chinese Patent Application No. 202422764869.5, filed on Nov. 13, 2024, which is hereby incorporated by reference in its entirety.

TECHNICAL FIELD

The present disclosure relates to the field of wall lamps technologies, and in particular, to a rechargeable wall lamp.

BACKGROUND

As a common lighting tool, wall lamps can not only serve as basic lighting fixtures, but also serve as decorative items to enhance indoor aesthetics and create unique light and shadow effects. The existing wall lamps are generally equipped with plugs, which are connected to sockets or row sockets on the wall through the plugs. The use scope is limited by the distribution of sockets and cannot be flexibly placement.

SUMMARY

Embodiments of the present disclosure provide a rechargeable wall lamp, which can be flexibly placed by providing a rechargeable battery as a power supply.

In order to achieve the above objectives, the embodiment of the present disclosure provides the rechargeable wall lamp, which includes a front shell, a rear cover, a rechargeable battery, a carrier plate, a light emitting component, and a circuit board;

- an interior of the front shell includes an accommodation space, a front side of the front shell is provided with a translucent recess, a bottom of the translucent recess is hollowed out to communicate with the accommodation space, the rear cover is fixed to a rear side of the front shell to cover the accommodation space;
- the carrier plate is fixed to the front shell and located in a bottom hollow area of the translucent recess; the light emitting component is provided on one side of the carrier plate facing a notch of the translucent recess; the rechargeable battery and the circuit board are provided in the accommodation space; the rechargeable battery is connected to the circuit board, and the circuit board is connected to the light emitting component; the rear cover further includes a socket fixing hole, and the circuit board is connected to a charging socket for charging the rechargeable battery; the charging socket is fixed in the socket fixing hole.

Beneficial effect: the present disclosure provides a rechargeable wall lamp, which can be flexibly placed without being limited by a position of a socket by providing a rechargeable battery as a power supply.

BRIEF DESCRIPTION OF DRAWINGS

Combining with the accompanying drawings, a detailed description of the specific implementation mode of the present disclosure will render the technical solution and its beneficial effects obvious.

DESCRIPTION OF EMBODIMENTS

Figure 1:
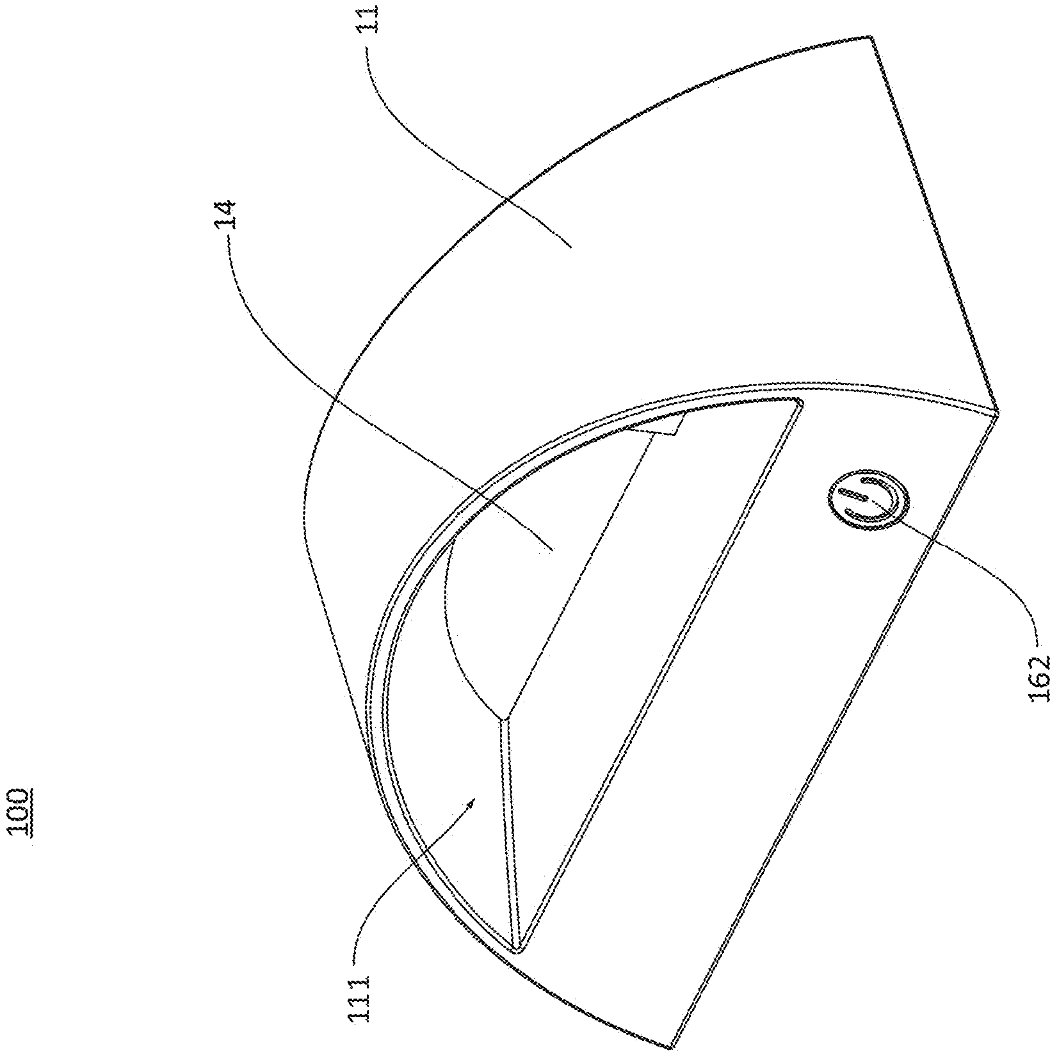
FIG. 1 is a front view of a rechargeable wall lamp of the present disclosure.
Figure 2:
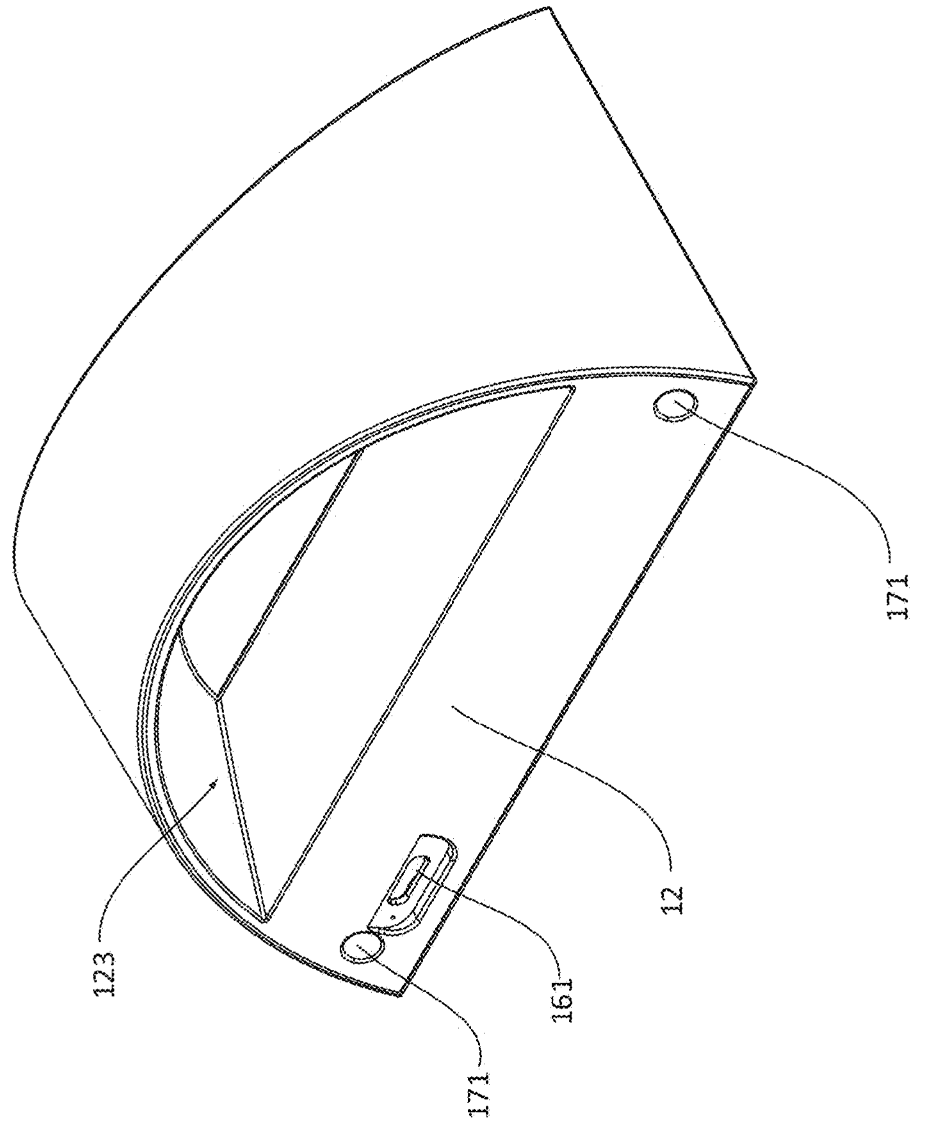
FIG. 2 is a rear view of the rechargeable wall lamp of the present disclosure.
Figure 3:
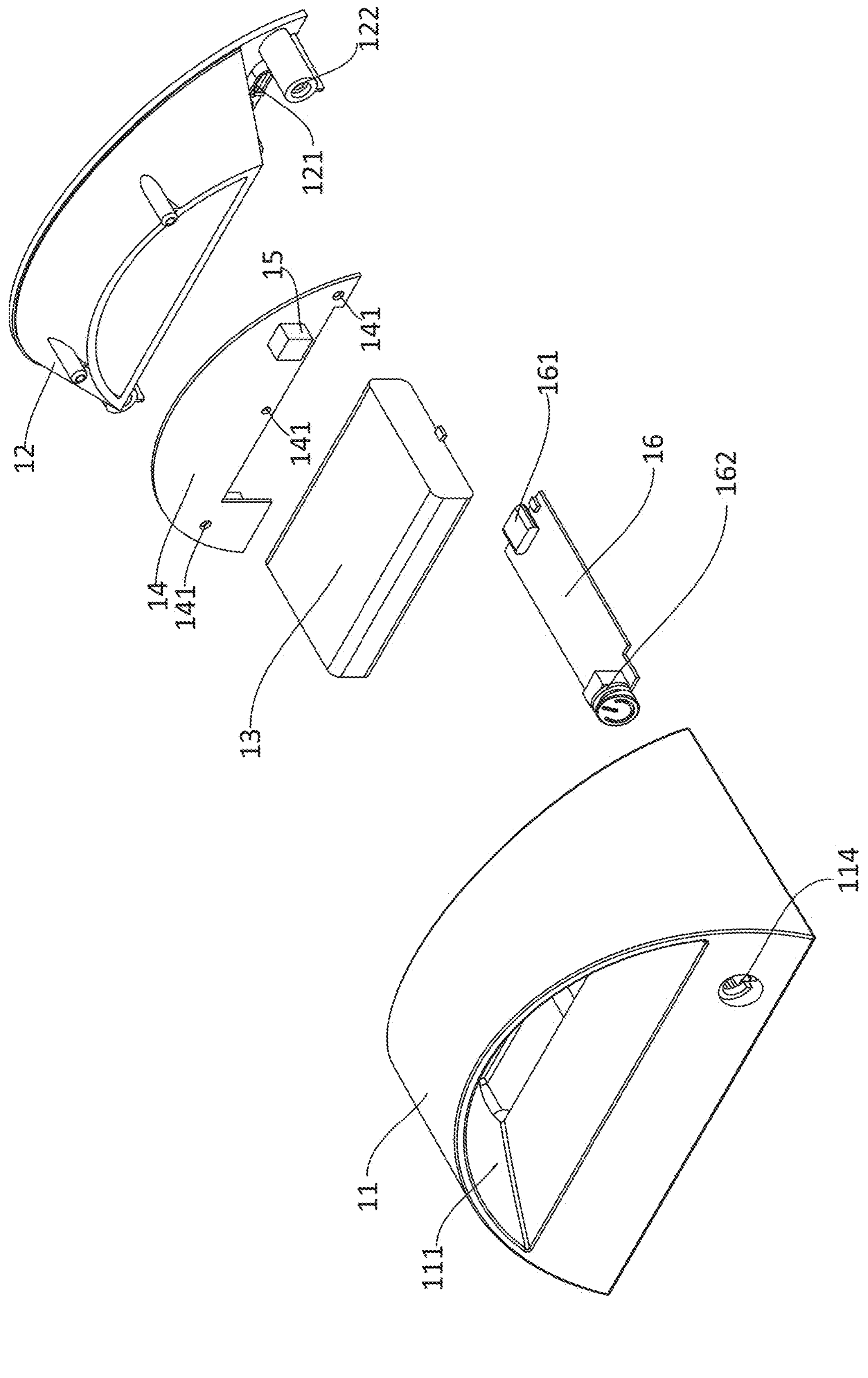
FIG. 3 is an exploded schematic diagram of the rechargeable wall lamp of the present disclosure.
Figure 4:
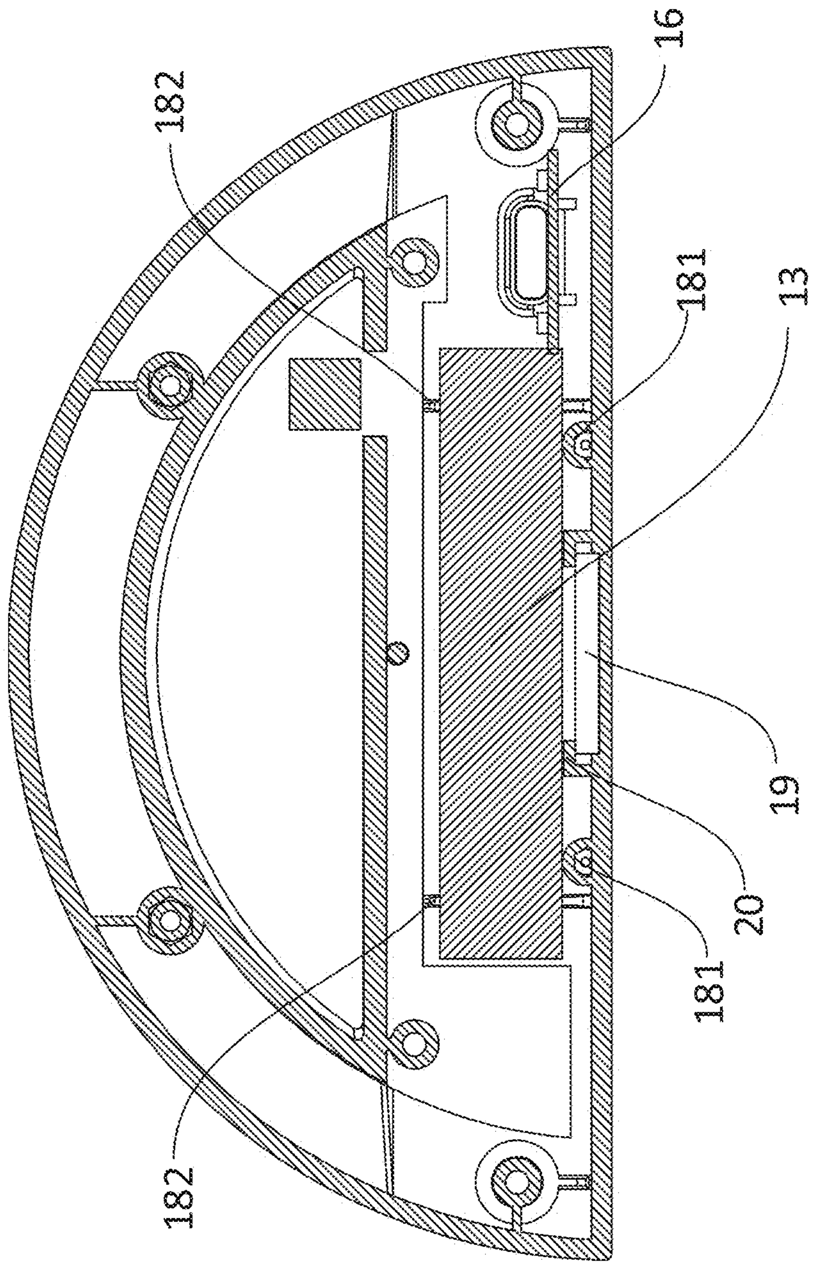
FIG. 4 is a cross-sectional view of the rechargeable wall lamp of the present disclosure.
Figure 5:
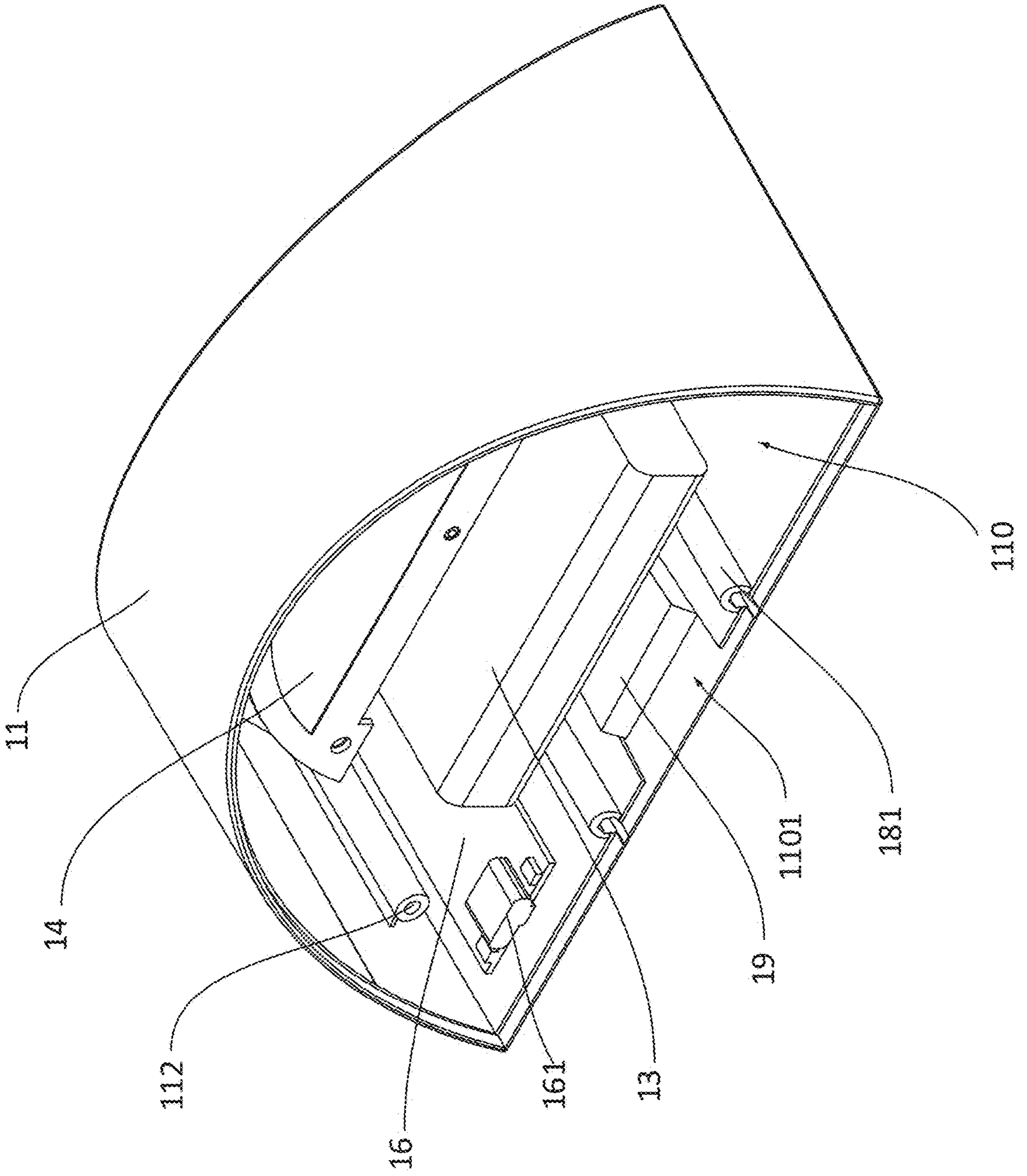
FIG. 5 is a rear view of the rechargeable wall lamp after removing a rear cover of the present disclosure.
Figure 6:
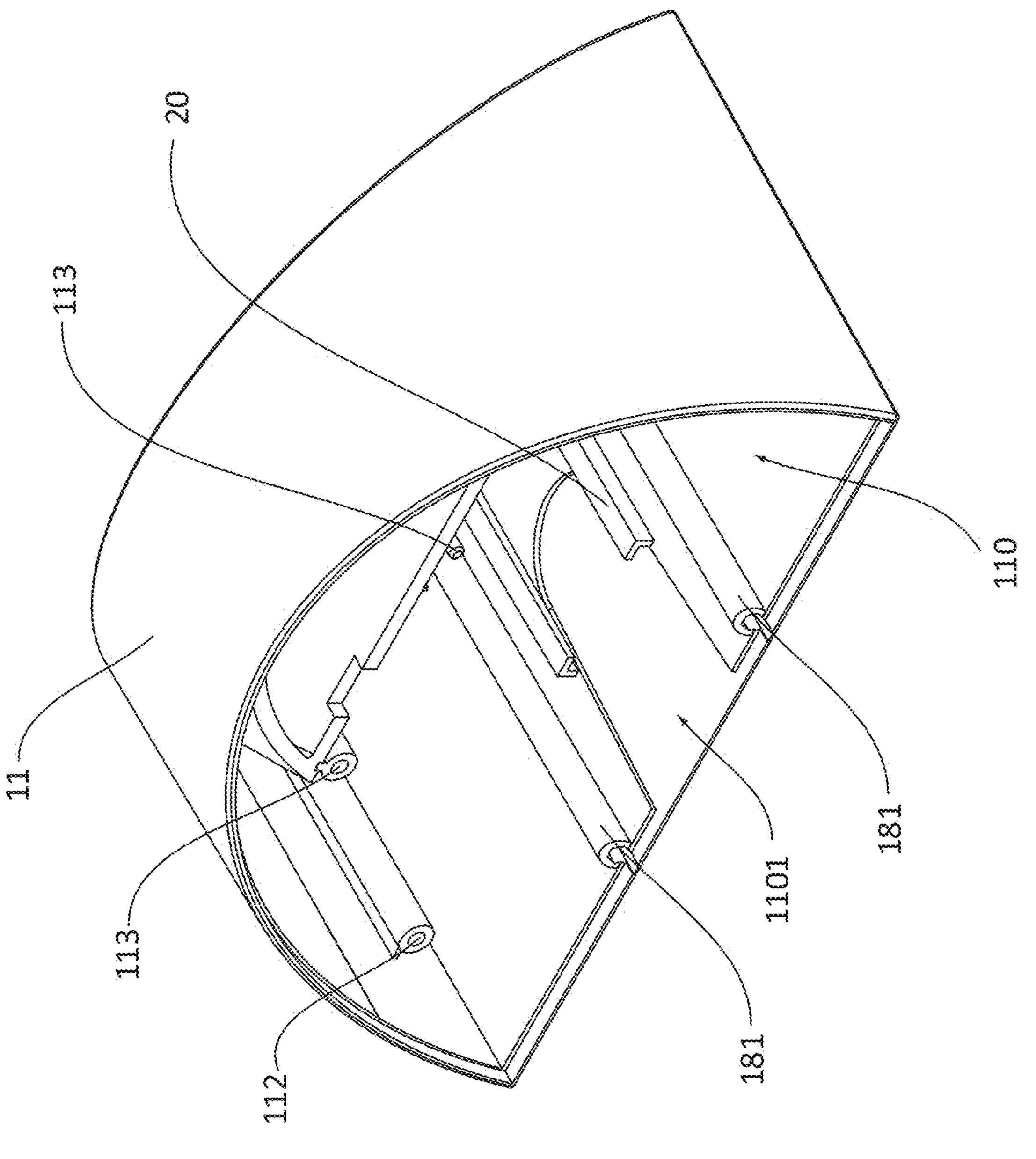
FIG. 6 is a schematic structural diagram of a front shell of the present disclosure.

Please refer to the drawings, where the same reference number represents the same components. The principle of the present disclosure is illustrated by implementing it in an appropriate computing environment. The following explanation is based on specific embodiments of the present disclosure illustrated and should not be construed as limiting other specific embodiments of the present disclosure that are not described in detail herein.

Referring to FIGS. 1 to 6, a rechargeable wall lamp 100 according to an embodiment of the present disclosure includes a front shell 11, a rear cover 12, a rechargeable battery 13, a carrier plate 14, a light emitting component 15, and a circuit board 16.

An interior of the front shell 11 includes an accommodation space 110, a front side of the front shell 11 is provided with a translucent recess 111, that is, a notch of the translucent recess 111 is located on the front side. The front shell 11 is recessed from the front side towards a rear side so as to form the translucent recess 111, and a bottom of the translucent recess 111 is hollowed out to communicate with the accommodation space 110. The rear cover 12 is fixed to a rear side of the front shell 11 to cover the accommodation space 110.

The carrier plate 14 is fixed to the front shell 11 and located in a bottom hollow area of the translucent recess 111, thereby exposing the carrier plate 14. The light emitting component 15 is provided on one side of the carrier plate 14 facing the notch of the translucent recess 111, so that light emitted by the light emitting component 15 diverges from the notch of the translucent recess 111, achieving illumination. The rechargeable battery 13 and the circuit board 16 are provided in the accommodation space 110. The rechargeable battery 13 is connected to the circuit board 16, and the circuit board 16 is connected to the light emitting component 15. The rear cover 12 is further provided with a socket fixing hole 121. The circuit board 16 is connected to a charging socket 161 for charging the rechargeable battery 13, and the charging socket 161 is fixed in the socket fixing hole 121. The circuit board 16 is configured to drive the light emitting component 15 to emit light. In the present disclosure, the rechargeable battery 13 serves as a power supply. Thus, there is no need to be limited by the position of the socket, and the wall lamp can be flexibly placed.

Where, the front shell 11 and the rear cover 12 can be fixed by various ways such as buckles, screws, or adhesives. Taking a threaded connection as an example, the rechargeable wall lamp 100 further includes a first fixing screw 171. The interior of the front shell 11 is provided with a first threaded hole 112, and the rear cover 12 is provided with a second threaded hole 122 corresponding to the first threaded hole 112. The first fixing screw 171 is simultaneously threaded with the first threaded hole 112 and the second threaded hole 122 to fix the front shell 11 and the rear cover 12. Where, the number of first threaded hole 112, the second threaded hole 122, and the first fixing screw 171 can all be two, and each first fixing screw 171 is used to connect one first threaded hole 112 and one second threaded hole 122.

In an implementation mode, the rechargeable wall lamp 100 further includes a second fixing screw (not shown), the front shell 11 is provided with a first fixing hole 113, and the carrier plate 14 is provided with a second fixing hole 141 corresponding to the first fixing hole 113. The second fixing screw is simultaneously threaded with the first fixing hole 113 and the second fixing hole 141 to fix the carrier plate 14 to the front shell 11. The number of the second fixing screw, the first fixing hole 113, and the second fixing hole 141 can all be three, and each second fixing screw is used to connect one first fixing hole 113 and one second fixing hole 141.

In the embodiment of the present disclosure, a clamping component for clamping the rechargeable battery 13 is provided in the accommodation space 110. The clamping component includes a battery fixing component 181 located on a bottom wall of the accommodation space 110 and a clamping portion 182 arranged opposite to the battery fixing component 181. The rechargeable battery 13 can be detachably clamped between the battery fixing component 181 and the clamping portion 182. Where, space between the rechargeable battery 13 with the battery fixing component 181 and the clamping portion 182 may be an interference fit, so that the rechargeable battery 13 is more stably clamped between the battery fixing component 181 and the clamping portion 182. Of course, the rechargeable battery 13 can also be fixed in the accommodation space 110 by other means such as bonding or bundling.

In an implementation mode, the rechargeable wall lamp 100 further includes a magnetic suction member 19, and there are two battery fixing components 181. The battery fixing components 181 are protruded from the bottom wall of the accommodation space 110, thereby forming a receiving groove 1101 between the two battery fixing components 181. The magnetic suction member 19 is provided in the receiving groove 1101. Besides that, a protective component 20 is further provided between the magnetic suction member 19 and the rechargeable battery 13. Where, the magnetic suction member 19 is used to fix the rechargeable wall lamp 100 to metal parts or magnetic members through magnetic suction manner, such as fixed to iron walls, iron cabinets, etc., which greatly facilitates the use of the rechargeable wall lamp 100.

Where, one side of the rear cover 12 facing away from the front shell 11 includes a recessed portion 123 that is concave towards the front shell 11, and a bottom of the recessed portion 123 is provided correspondingly to the bottom of the translucent recess 111, and a bottom of the recessed portion 123 abuts against the carrier plate 14. To improve the illumination brightness, a reflective layer can be applied on one side of the carrier plate 14 facing the notch of the translucent recess 111 to reflect the light out. In other embodiments, the carrier plate 14 can also be a transparent translucent member, and the light emitted by the light emitting component 15 is emitted through the translucent member. At this time, reflective film can be coated on a surface of the bottom of the recessed portion 123 that is facing one side of the carrier plate 14 so as to reflect the light and improve the brightness of the light emitted from the translucent recess 111.

In the embodiment of the present disclosure, an operation of the light emitting component 15 can be controlled by a switch button, and the circuit board 16 can control the rechargeable wall lamp 100 to adjust brightness and color by receiving a button instruction of the switch button.

Where, the switch button can be a mechanical button. In an implementation mode, the front shell 11 is provided with a button fixing hole 114, and the circuit board 16 is connected to the mechanical button 162. The mechanical button 162 is fixed in the button fixing hole 114 and is used to control the operation of the light emitting component 15.

Figure 7:
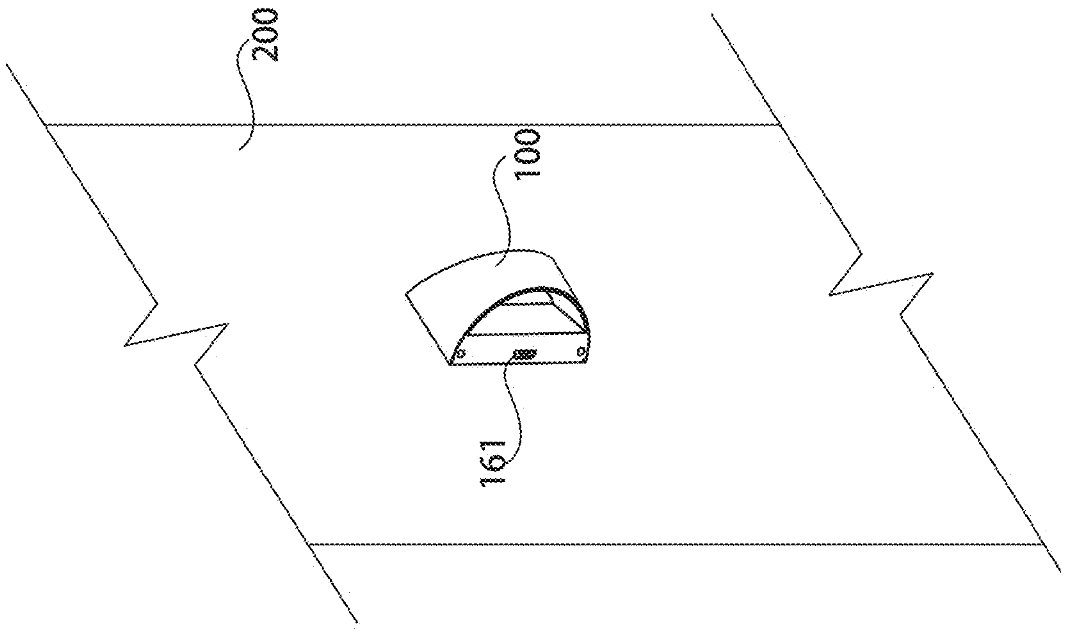
FIG. 7 is a schematic diagram of an installation of the rechargeable wall lamp on a wall of the present disclosure.
Figure 8:
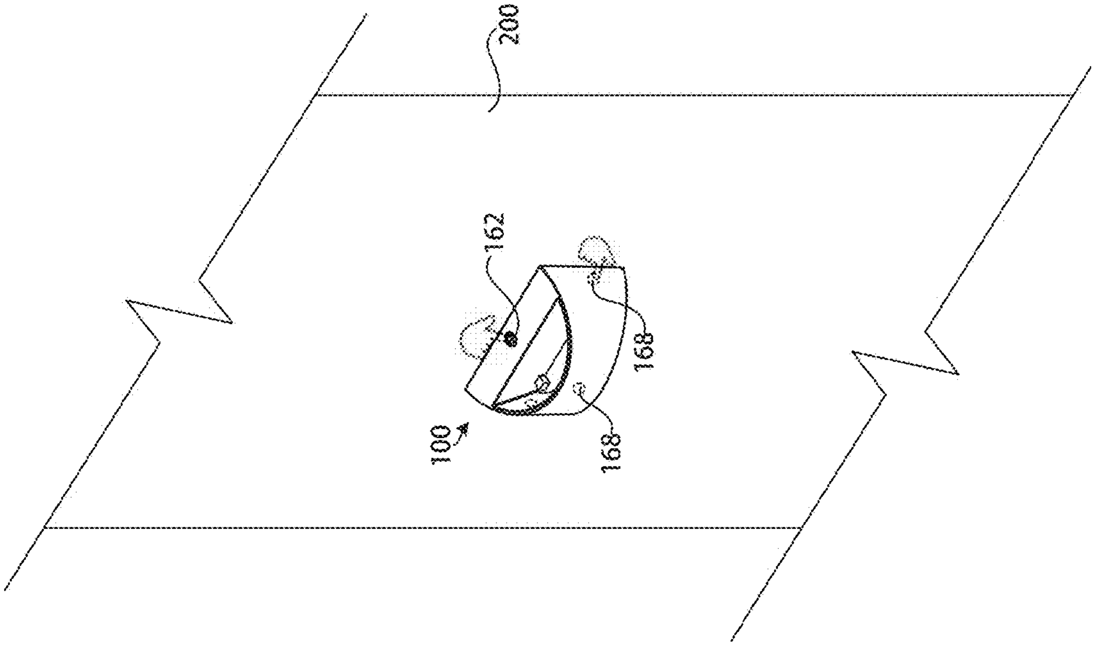
FIG. 8 is a schematic diagram of a switch position when the rechargeable wall lamp is installed on the wall according to the present disclosure.
Figure 9:
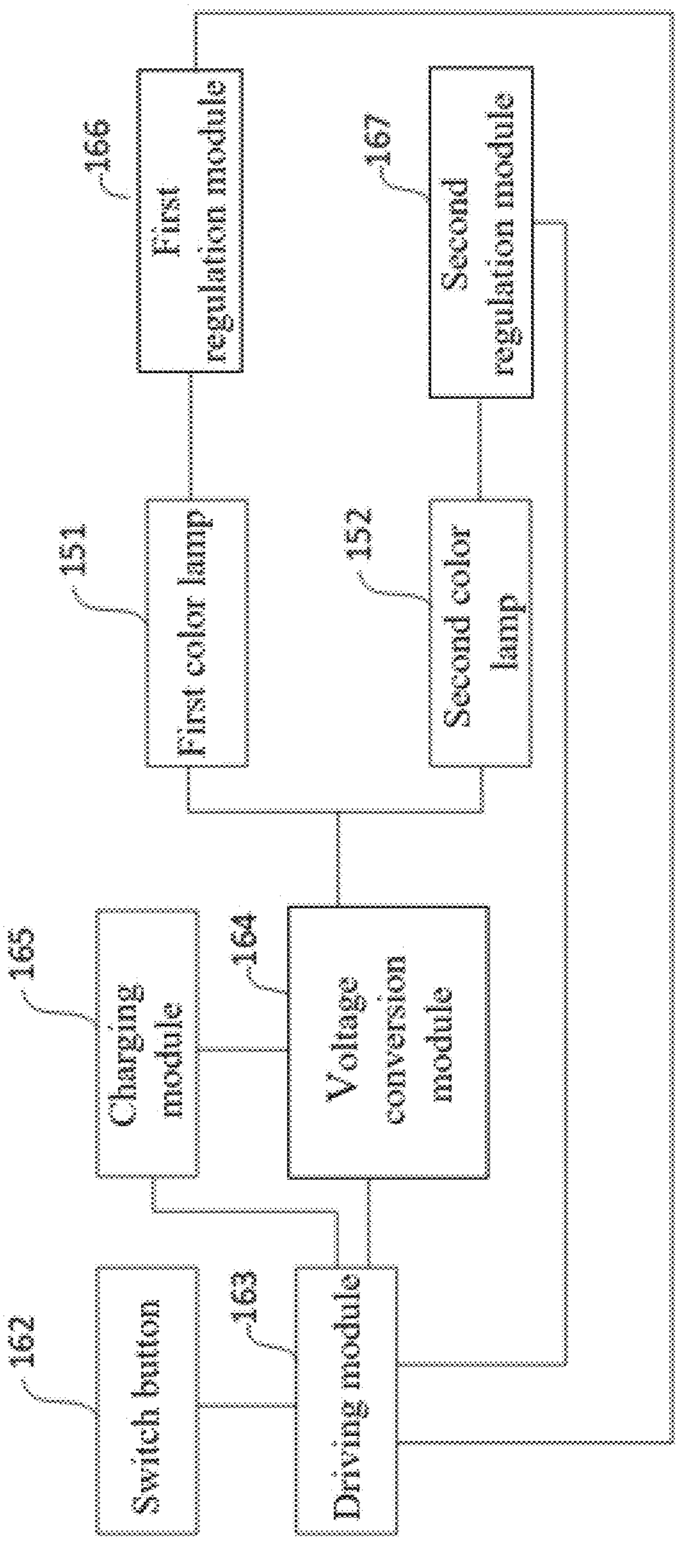
FIG. 9 is a schematic diagram of a control circuit of the rechargeable wall lamp of the present disclosure.

In other embodiments, referring to FIGS. 7-8, the rechargeable wall lamp 100 can be attached to a wall 200 through the magnetic suction member 19, and the installation position is not limited. It can be set vertically or parallel, and the switch button can also be a touch button 168. A plurality of touch buttons 168 can be set for user operation. For example, one touch button 168 can be provided on the front side of the front shell 11, and one touch button 168 can also be provided on a left side or a right side of the front shell 11 for convenient use. The charging socket 161 can also be located in a middle of the rear cover 12. It can be understood that the mechanical button 162 and the touch button 168 have the same function, both of which are used to control the operation of the light emitting component 15.

Where, the touch button 168 is provided in the front shell 11, and a touch area is formed on an outer surface of the front shell 11. The touch area is provided correspondingly to a sensing area of the touch button 168, so there is no need to provide the button fixing hole on the front shell 11, which can beautify the appearance. In an implementation mode, button identification can be provided in the touch area to render a position of the touch button clear at a glance. When the touch area is activated, the button identification can be illuminated.

In an implementation mode, the mechanical button 162 and the touch button 168 can exist simultaneously, or only one of them can be set, without limitation.

Referring to FIGS. 9 to 12, the circuit board 16 includes a control circuit, and the control circuit includes a driving module 163, a voltage conversion module 164, a charging module 165, a first regulation module 166, and a second regulation module 167. The light emitting component 15 includes a first color lamp 151 and a second color lamp 152. The first color lamp 151 can be, for example, a yellow LED light, and the second color lamp 152 can be, for example, a white LED light. In other embodiments, the first color lamp 151 and the second color lamp 152 can also be LED lights of other colors, such as blue LED lights or red LED lights, without limitation.

The driving module 163 is respectively connected to the mechanical button 162, the charging module 165, the voltage conversion module 164, the first regulation module 166, and the second regulation module 167. The charging module 165 is connected to the charging socket 161, and the charging socket 161 can be a TYPE-C interface. It is connected to an external power source through the charging socket 161 and is used to charge the rechargeable battery 13 under a control of the driving module 163 and output an initial working voltage VCC. The voltage conversion module 164 is configured to convert the initial working voltage VCC into a target working voltage required for the first color lamp 151 and the second color lamp 152 under the control of the driving module 163. The first regulation module 166 is connected to the first color lamp 151 and is configured to adjust a brightness of the first color lamp 151 under the control of the driving module 163; the second regulation module 167 is connected to the second color lamp 152 and is configured to adjust a brightness of the second color lamp 152 under the control of the driving module 163.

In an implementation mode, the driving module 163 includes a fourth driving chip U4, a thirtieth resistor R30, a seventh capacitor C7, and a thirteenth capacitor C13; a VDD (Voltage Drain Drain) pin of the fourth driving chip U4 is connected to an output terminal of the charging module 165 through the thirtieth resistor R30. One end of the seventh capacitor C7 and one end of the thirteenth capacitor C13 are both connected to the VDD pin of fourth driving chip U4. The VDD pin of the fourth driving chip U4 is connected to a 3.3V working voltage; the other end of the seventh capacitor C7 and the other end of the thirteenth capacitor C13 are grounded. A PWM0/IO0 (Pulse Width Modulation/ Input/Output) pin and an EN (enable) pin of the fourth driving chip U4 are respectively connected to the voltage conversion module 164. A PWM2/IO1 pin of the fourth driving chip U4 is connected to the first regulation module 166, a IO13/PWM1 pin of the fourth driving chip U4 is connected to the second regulation module 167, an AN1 (Analog signal input)/IO2 pin of the fourth driving chip U4 is connected to the charging module 165, and an AN4/IO6 pin of the fourth driving chip U4 is connected to the mechanical button 162.

Figure 10:
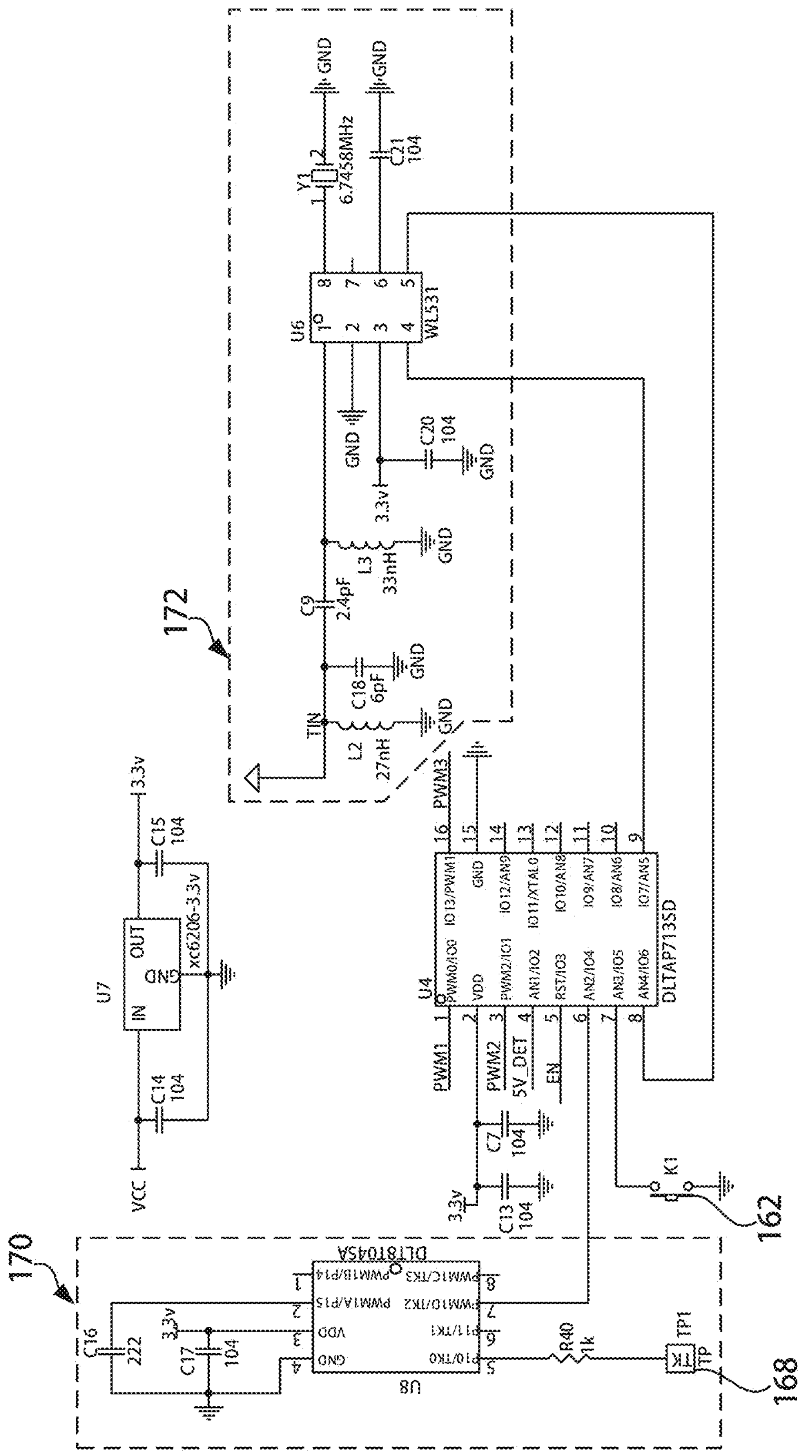
FIG. 10 is a schematic diagram of a circuit connecting a driving module, a touch button, and a wireless receiving module of the present disclosure.
Figure 11:
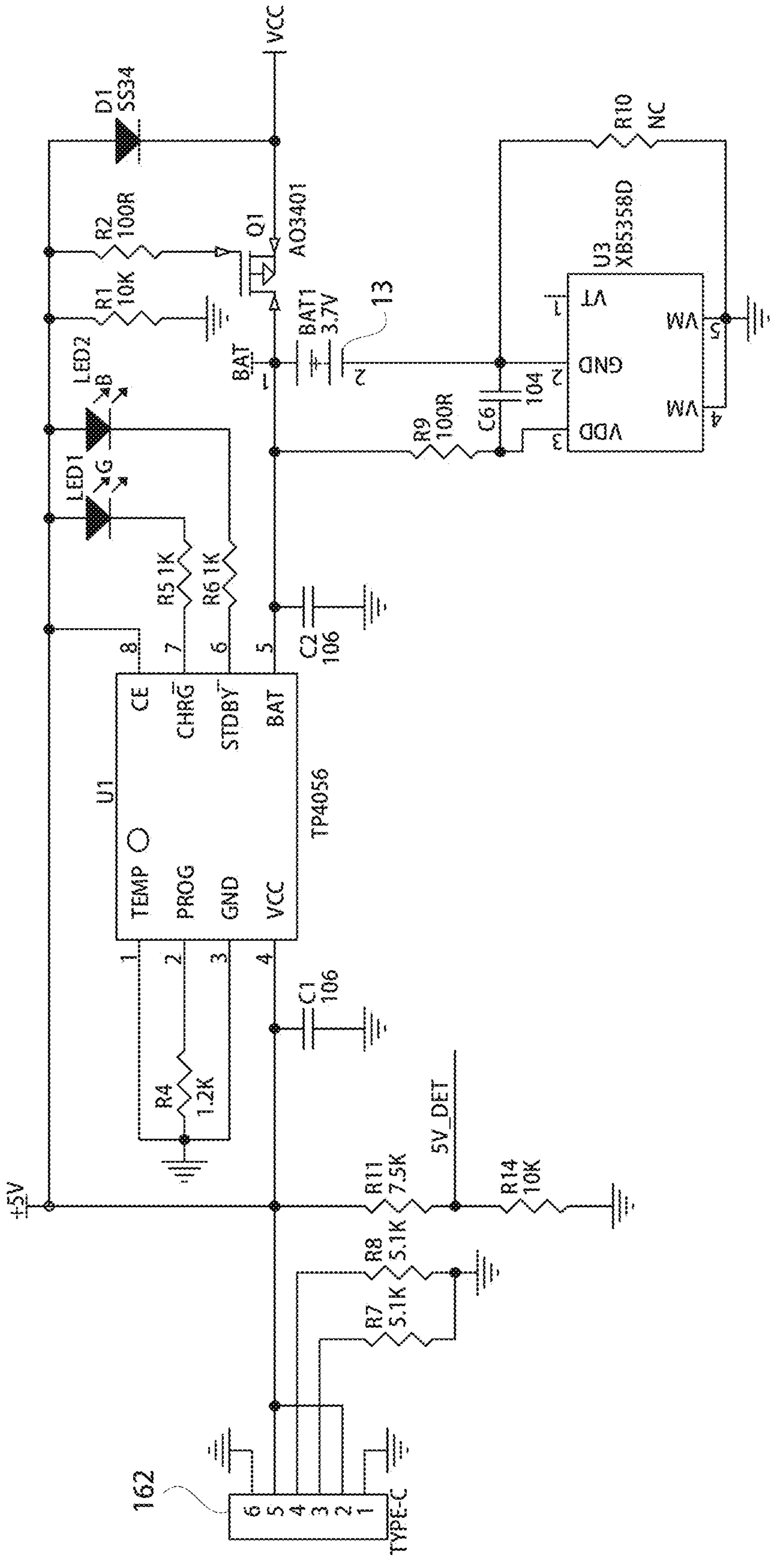
FIG. 11 is a circuit schematic diagram of a charging module of the present disclosure.
Figure 12:
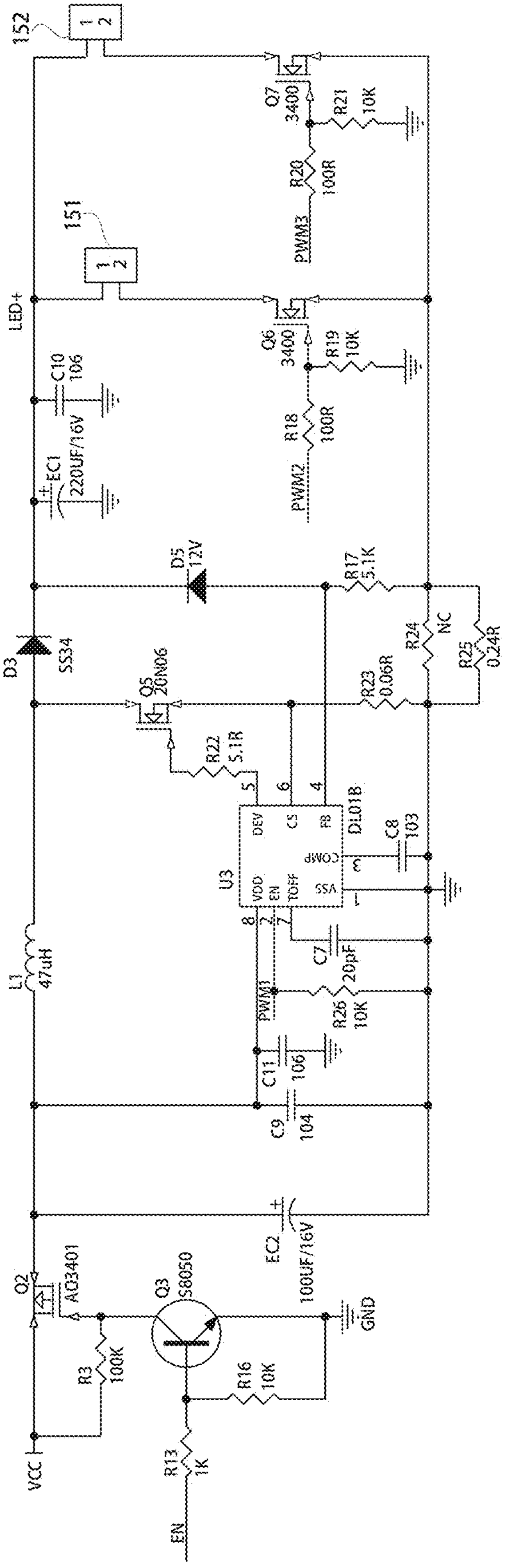
FIG. 12 is a circuit schematic of a voltage conversion module of the present disclosure.

As shown in FIG. 10, the present disclosure further provides a specific circuit structure for the touch button 168 to achieve a touch function. The touch button 168 includes an eighth chip U8 and its peripheral circuit. The eighth chip U8 is connected to an AN2/IO4 pin of the fourth driving chip U4 through a seventh pin, and a fifth pin of the eighth chip U8 is connected to the sensing area TP1 through a fortieth resistor R40. The touch button 168 receives a touch command through the sensing area TP1.

Where, the charging module 165 includes a first charging chip U1, a first resistor R1, a second resistor R2, a fourth resistor R4, a fifth resistor R5, a sixth resistor R6, a seventh resistor R7, an eighth resistor R8, a ninth resistor R9, a tenth resistor R10, an eleventh R11, a fourteenth resistor R14, a first capacitor C1, a second capacitor C2, a sixth capacitor C6, a first diode D1, a first MOS transistor Q1, a third charging protection chip U3, a first indicator light LED1, and a second indicator light LED2. Where the first MOS transistor Q1 is a P-type MOS transistor.

A VCC (Voltage Collector Collector) pin and a CE (Chip Enable) pin of the first charging chip U1, a positive electrode of the first indicator light LED1, a positive electrode of the second indicator light LED2, one end of the first resistor R1, one end of the second resistor R2, a positive electrode of the first diode D1, one end of the first capacitor C1, and one end of the eleventh resistor R11 are all connected to a fifth pin of the charging socket 161. A negative electrode of the first indicator light LED1 is connected to a CHRG (–) (Charging status indicator) pin of the first charging chip U1 through the fifth resistor R5, and a negative electrode of the second indicator light LED2 is connected to a STDBY (–) (Charging end indicator) pin of the first charging chip U1 through the sixth resistor R6. The other end of the first resistor R1 is grounded, and the other end of the second resistor R2 is connected to a gate electrode of the first MOS transistor Q1. A negative electrode of the first diode D1 is connected to a source electrode of the first MOS transistor Q1, and a connection node is the output terminal of the charging module, used for outputting the initial working voltage. A drain electrode of the first MOS transistor Q1 is connected to a positive electrode of the rechargeable battery; one end of the second capacitor C2, and one end of the ninth resistor R9 are both connected to a BAT (Battery connection) pin of the first charging chip U1. The other end of the second capacitor C2 is grounded, the other end of the ninth resistor R9 is connected to a VDD pin of the third charging protection chip U3, a negative electrode of the rechargeable battery 13 is connected to a GND (Ground) pin of the third charging protection chip U3, the sixth capacitor C6 is connected between a VDD pin and a GND pin of the third charging protection chip U3, the tenth resistor R10 is connected between a VM (Voltage monitor) pin and a GND pin of the third charging protection chip U3, the other end of the first capacitor C1 is grounded, and the other end of the eleventh resistor R11 is connected to the AN1/IO2 pin of the fourth driving chip U4 and are grounded through the fourteenth resistor R14. A third pin and a fourth pin of the charging socket 161 are respectively grounded through the seventh resistor R7 and the eighth resistor R8; one end of the fourth resistor R4 is connected to a PROG (Charging current detection settings and detection) pin of the first charging chip U1; the other end of the fourth resistor R4, a TEMP pin and a GND pin of the first charging chip U1 are all grounded.

The voltage conversion module 164 includes a second MOS transistor Q2, a third transistor Q3, a fifth MOS transistor Q5, a fifth power control chip U5, a third diode D3, a fifth diode D5, a first inductor L1, a third resistor R3, a thirteenth resistor R13, a sixteenth resistor R16, a seventeenth resistor R17, a twenty-second resistor R22, a twenty-third resistor R23, a twenty-fourth resistor R24, a twenty-fifth resistor R25, a twenty-sixth resistor R26, a seventh capacitor C7, an eighth capacitor C8, a ninth capacitor C9, a tenth capacitor C10, an eleventh capacitor C11, a first electrolytic capacitor EC1, and a second electrolytic capacitor EC2; the first regulation module 166 includes a sixth MOS transistor Q6, an eighteenth resistor R18, and a nineteenth resistor R19; the second regulation module 167 includes a seventh MOS transistor Q7, a twentieth resistor R20, and a twenty-first resistor R21. The sixth MOS transistor Q6 and the seventh MOS transistor Q7 are N-type MOS transistors.

One end of the third resistor R3 is connected to a source electrode of the second MOS transistor Q2 and the output terminal of the charging module 165; the other end of the third resistor R3 is connected to a gate electrode of the second MOS transistor Q2 and a collector electrode of the third transistor Q3; one end of the thirteenth resistor R13 is connected to a RST (Reset)/IO3 pin of the fourth driving chip U4; the other end of the thirteenth resistor R13 is connected to a base electrode of the third transistor Q3; an emitter electrode of the third transistor Q3 is grounded; the sixteenth resistor R16 is connected between a base electrode and an emitter electrode of the third transistor Q3; a drain electrode of the second MOS transistor Q2 is connected to one end of the first inductor L1, a positive electrode of the second electrolytic capacitor EC2, one end of the ninth capacitor C9, one end of the eleventh capacitor C11, and a VDD pin of the fifth power control chip U5. A negative electrode of the second electrolytic capacitor E2, the other end of the ninth capacitor C9, and the other end of the eleventh capacitor C11 are all grounded. The other end of the first inductor L1 is connected to a positive electrode of the third diode D3 and a drain electrode of the fifth MOS transistor Q5. An EN pin of the fifth power control chip U5 is grounded through the twenty-sixth resistor R26; a TOFF (Off time setting) pin of the fifth power control chip U5 is grounded through the seventh capacitor C7; a COMP (Error amplifier compensation) pin of the fifth power control chip U5 is grounded through the eighth capacitor C8; and a EDV (Battery discharge cut-off voltage pin) pin of the fifth power control chip U5 is connected to a gate electrode of the fifth MOS transistor Q5 through the twenty-second resistor R22. A CS (Chip Select) pin of the power control chip U5 is connected to a source electrode of the fifth MOS transistor Q5 and one end of the twenty-third resistor R23. The other end of the twenty-third resistor R23, one end of the twenty-fourth resistor R24 and one end of the twenty-fifth resistor R25 are all grounded. The other end of the twenty-fourth resistor R24 and the other end of the twenty-fifth resistor R25, one end of the seventeenth resistor R17, a gate electrode of the sixth MOS transistor Q6, and a gate electrode of the seventh MOS transistor Q7 are connected. The other end of the seventh resistor R17 and a positive electrode of the fifth diode D5 are both connected to a FB (Current feedback input, namely, a magnitude of current output) pin of the fifth power control chip U5. A negative electrode of the fifth diode D5 is connected to a negative electrode of the third diode D3, a positive electrode of the first electrolytic capacitor EC1, one end of the tenth capacitor C10, a positive electrode of the first color lamp 151, and a positive electrode of the second color lamp 152. A negative electrode of the first electrolytic capacitor EC1 and a negative electrode of the tenth capacitor C10 are both grounded. A negative electrode of the first color lamp 151 is connected to a drain electrode of the sixth MOS transistor Q6, and a negative electrode of the second color lamp 152 is connected to a drain electrode of the seventh MOS transistor Q7. A gate electrode of the sixth MOS transistor Q6 is connected to a PWM2/IO1 pin of the fourth driving chip U4 through the eighteenth resistor R18. A gate electrode of the seventh transistor Q7 is connected to an IO13/PWM1 pin of the fourth driving chip U4 through the twentieth resistor R20. One end of the nineteenth resistor R19 is connected to a gate electrode of the sixth MOS transistor Q6 and the other end thereof is grounded. One end of the twenty-first resistor R21 is connected to a gate electrode of the seventh MOS transistor Q7 and the other end thereof is grounded.

The control circuit further includes a wireless receiving module, which is connected to the driving module and configured to receive wireless remote-control command. The wireless receiving module can be, for example, an infrared receiving module or a Bluetooth receiving module.

The working principle of the control circuit of the present disclosure will be further introduced below.

When the charging socket 161 is connected to the external power source, the fourth driving chip U4 outputs a 5V_DET control signal through the AN1/IO2 pin to the charging module 165 that is between the eleventh resistor R11 and the fourteenth resistor R14, so that the first charging chip U1 charges the rechargeable battery 13. At this time, the first MOS transistor Q1 is in a high-level cut-off state, and the 5V voltage provided by the external power source is reduced by the first diode D1 to obtain the initial working voltage VCC and output to the voltage conversion module 164 and the driving module 163. The first indicator light LED1 is used to indicate that the rechargeable battery 13 is charging, and the second indicator light LED2 is used to indicate that the rechargeable battery 13 is fully charged. The first indicator light LED1 can be a green light, and the second indicator light LED2 can be a blue light. When the charging socket 161 is not connected to the external power source, the first MOS transistor Q1 is in a low-level conductive state. At this time, the rechargeable battery 13 outputs the initial working voltage VCC through the first MOS transistor Q1, thereby providing the working voltage for the voltage conversion module 164 and the driving module 163.

The model of the third charging protection chip U3 can be XB5358D, which can prevent overcharging and excessive discharge of the rechargeable battery 13 through the third charging protection chip U3, ensuring the safety of the rechargeable battery 13 during use and extending its service life.

In addition, the fourth driving chip U4 outputs a PWM1 control signal to the fifth power control chip U5 through the PWM0/IO0 pin, so that the fifth power control chip U5 converts the initial working voltage VCC into the target working voltage of the first color lamp 151 and the second color lamp 152, thereby driving the first color lamp 151 and the second color lamp 152 to emit light. The fourth driving chip U4 outputs a PWM2 control signal to the first regulation module 166 through the PWM2/IO1 pin. By adjusting a duty cycle of the PWM2 control signal, the brightness of the first color lamp 151 can be adjusted. The driving chip U4 outputs a PWM3 control signal to the second regulation module 167 through the IO13/PWM1 pin. By adjusting the duty cycle of the PWM3 control signal, the brightness of the second color lamp 152 can be adjusted. When the PWM2 control signal remains low, the sixth MOS transistor Q6 is in an off state, and the first color lamp 151 is in the off state. When the PWM3 control signal remains low, the seventh MOS transistor Q7 is in the off state, and the second color lamp 152 is in the off state. Therefore, when the first color lamp 151 emits light, the second color lamp 152 can be turned off by the PWM3 control signal. When the second color lamp 152 emits light, the first color lamp 152 can be turned off by the PWM2 control signal, thereby achieving a switching between the first color lamp 151 and the second color lamp 152.

In one implementation, the switch command can be input through the mechanical button 162, and the fourth driving chip U4 can switch between the first color lamp 151 and the second color lamp 152, as well as adjust the brightness of the first color lamp 151 and the second color lamp 152 by receiving the switch command. For example, assuming that each color lamp has two brightness gears, when the mechanical button 162 is pressed for a first time, the first color lamp 151 is turned on by default. At this time, the brightness of the first color lamp 151 is in a first gear, and the second color lamp 152 is in the off state. After pressing the mechanical button 162 for a second time, the switch command is to adjust the brightness of the first color lamp 151 to a second gear. That is, after pressing the mechanical button 162 for the second time, the first color lamp 151 still lights up and the brightness is adjusted from the first gear to the second level. After pressing the mechanical button 162 for a third time, the second color lamp 152 lights up and the first color lamp 151 is in the off state. At this time, the brightness of the second color lamp 152 is in a first gear. After pressing the mechanical button 162 for a fourth time, the brightness of the second color lamp 152 is adjusted to a second gear, while the first color lamp 151 remains in the off state. After pressing the mechanical button 162 for a fifth time, the second color lamp 152 and the first color lamp 151 are both turned off. After pressing the mechanical button 162 for a sixth time, it returns to a state where the first color lamp 151 is on and the second color lamp 152 is off. This cycle is repeated, that is, the mechanical button 162 switches between different color lamps and adjusts the brightness of the color lamps for every 5 pressing cycles. Through the above ways, the function of single key switching color lamps and adjusting color lamp brightness can be achieved, achieving a purpose of color and brightness adjustments.

In other embodiments, switch commands can also be input through the touch button 168, and its working principle is the same as that of the mechanical button 162, which will not be elaborated here.

In an implementation mode, the switch command can also be input through a wireless remote-control way to achieve color lamp color switching and brightness adjustment. That is, the wireless receiving module wirelessly receives the remote-control signal of a wireless remote controller, and the fourth driving chip U4 switches color lamps and adjusts brightness based on a received remote-control signal. For example, the wireless remote controller can be provided with a first color lamp button, a second color lamp button, a first gear brightness button, a second gear brightness button, etc., and different buttons can be used to obtain corresponding remote-control signals, thereby achieving brightness and color adjustment. As shown in FIG. 10, the control circuit may further include a wireless receiving module 172, which includes a sixth receiving chip U6 and its peripheral circuit. A fourth pin and a fifth pin of the sixth receiving chip U6 are respectively connected to a ninth pin and an eighth pin of the fourth driving chip U4. The remote-control signal is wirelessly received through the sixth receiving chip U6 and transmitted to the fourth driving chip U4 so as to achieve color lamp switching and brightness adjustment.

This specification uses specific examples to explain the principles and implementation modes of the present disclosure. The above examples are only used to help understand the method and core idea of the present disclosure; meanwhile, for those skilled in the art, there may be changes in the specific implementation and application scope based on the ideas of the present disclosure. In summary, the content of this specification should not be understood as limiting the present disclosure.

What is claimed is:

1. A rechargeable wall lamp, comprising a front shell, a rear cover, a rechargeable battery, a carrier plate, a light emitting component, and a circuit board;

an interior of the front shell comprises an accommodation space, a front side of the front shell is provided with a translucent recess, a bottom of the translucent recess is hollowed out to communicate with the accommodation space, the rear cover is fixed to a rear side of the front shell to cover the accommodation space;

the carrier plate is fixed to the front shell and located in a bottom hollow area of the translucent recess; the light emitting component is provided on one side of the carrier plate facing a notch of the translucent recess; the rechargeable battery and the circuit board are provided in the accommodation space; the rechargeable battery is connected to the circuit board, and the circuit board is connected to the light emitting component;

the rear cover further comprises a socket fixing hole, and the circuit board is connected to a charging socket for charging the rechargeable battery; the charging socket is fixed in the socket fixing hole.

2. The rechargeable wall lamp according to claim 1, wherein the rechargeable wall lamp further comprises a first fixing screw and a second fixing screw, wherein the front shell is provided with a first threaded hole, and the rear cover is provided with a second threaded hole corresponding to the first threaded hole, the first fixing screw is simultaneously threaded with the first threaded hole and the second threaded hole to fix the front shell and the rear cover;

the interior of the front shell is further provided with a first fixing hole, and the carrier plate is provided with a second fixing hole corresponding to the first fixing hole;

the second fixing screw is simultaneously threaded with the first fixing hole and the second fixing hole to fix the carrier plate to the front shell.

3. The rechargeable wall lamp according to claim 1, wherein a clamping component configured for clamping the rechargeable battery is provided in the accommodation space; the clamping component comprises a battery fixing component located on a bottom wall of the accommodation space and a clamping portion arranged opposite to the battery fixing component;

the rechargeable battery is detachably clamped between the battery fixing component and the clamping portion.

4. The rechargeable wall lamp according to claim 3, wherein the rechargeable wall lamp further comprises a magnetic suction member, and there are two battery fixing components;

the battery fixing components are protruded relative to the bottom wall of the accommodation space, thereby forming a receiving groove between the two battery fixing components; the magnetic suction member is provided in the receiving groove;

a protective component is further provided between the magnetic suction member and the rechargeable battery.

5. The rechargeable wall lamp according to claim 1, wherein one side of the rear cover facing away from the front shell comprises a recessed portion that is concave towards the front shell, and a bottom of the recessed portion is provided correspondingly to the bottom of the translucent recess so as to abut against the carrier plate;

one side of the carrier plate facing the notch of the translucent recess is coated with a reflective layer.

6. The rechargeable wall lamp according to claim 1, wherein the circuit board is connected with a switch button;

the circuit board comprises a control circuit, and the control circuit comprises a driving module, a voltage conversion module, a charging module, a first regulation module, and a second regulation module;

the light emitting component comprises a first color lamp and a second color lamp;

the driving module is respectively connected to the switch button, the charging module, the voltage conversion module, the first regulation module, and the second regulation module;

the charging module is connected to the charging socket and connected to an external power source through the charging socket so as to charge the rechargeable battery under a control of the driving module and output an initial working voltage;

the voltage conversion module is configured to convert the initial working voltage into a target working voltage required for the first color lamp and the second color lamp under the control of the driving module;

the first regulation module is connected to the first color lamp and is configured to adjust a brightness of the first color lamp under the control of the driving module;

the second regulation module is connected to the second color lamp and is configured to adjust a brightness of the second color lamp under the control of the driving module.

7. The rechargeable wall lamp according to claim 6, wherein the switch button comprises a mechanical button and/or a touch button;

when the switch button comprises the mechanical button, the front shell is provided with a button fixing hole, and the mechanical button is fixed in the button fixing hole;

when the switch button comprises the touch button, and the touch button is provided in the front shell; a touch area is formed on an outer surface of the front shell, and the touch area is provided correspondingly to a sensing area of the touch button.

8. The rechargeable wall lamp according to claim 7, wherein the driving module comprises a fourth driving chip U4, a thirtieth resistor R30, a seventh capacitor C7, and a thirteenth capacitor C13;

a VDD pin of the fourth driving chip U4 is connected to an output terminal of the charging module through the thirtieth resistor R30;

one end of the seventh capacitor C7 and one end of the thirteenth capacitor C13 are both connected to the VDD pin of the fourth driving chip U4;

the other end of the seventh capacitor C7 and the other end of the thirteenth capacitor C13 are grounded;

a PWM0/IO0 pin and an EN pin of the fourth driving chip U4 are respectively connected to the voltage conversion module;

a PWM2/IO1 pin of the fourth driving chip U4 is connected to the first regulation module, a IO13/PWM1 pin of the fourth driving chip U4 is connected to the second regulation module, an AN1/IO2 pin of the fourth driving chip U4 is connected to the charging module, and an AN4/IO6 pin of the fourth driving chip U4 is connected to the mechanical button.

9. The rechargeable wall lamp according to claim 8, wherein the charging module comprises a first charging chip U1, a first resistor R1, a second resistor R2, a fourth resistor R4, a fifth resistor R5, a sixth resistor R6, a seventh resistor R7, an eighth resistor R8, a ninth resistor R9, a tenth resistor R10, an eleventh resistor R11, a fourteenth resistor R14, a first capacitor C1, a second capacitor C2, a sixth capacitor C6, a first diode D1, a first MOS transistor Q1, a third charging protection chip U3, a first indicator light LED1, and a second indicator light LED2.

10. The rechargeable wall lamp according to claim 8, wherein the voltage conversion module comprises a second MOS transistor Q2, a third transistor Q3, a fifth MOS transistor Q5, a fifth power control chip U5, a third diode D3, a fifth diode D5, a first inductor L1, a third resistor R3, a thirteenth resistor R13, a sixteenth resistor R16, a seventeenth resistor R17, a twenty-second resistor R22, a twenty-third resistor R23, a twenty-fourth resistor R24, a twenty-fifth resistor R25, a twenty-sixth resistor R26, a seventh capacitor C7, an eighteen capacitor C8, a ninth capacitor C9, a tenth capacitor C10, an eleventh capacitor C11, a first electrolytic capacitor EC1, and a second electrolytic capacitor EC2;

the first regulation module comprises a sixth MOS transistor Q6, an eighteenth resistor R18, and a nineteenth resistor R19, the second regulation module comprises a seventh MOS transistor Q7, a twentieth resistor R20, and a twenty-first resistor R21;

the control circuit further comprises a wireless receiving module, which is connected to the driving module configured for receiving wireless remote-control instruction.

* * * * *